(12) United States Patent
Morita et al.

(10) Patent No.: US 10,794,512 B2
(45) Date of Patent: Oct. 6, 2020

(54) ELECTRICALLY-DRIVEN FLOW RATE CONTROL VALVE

(71) Applicant: Kabushiki Kaisha Kobe Seiko Sho (Kobe Steel, Ltd.), Hyogo (JP)

(72) Inventors: Kei Morita, Kobe (JP); Naoki Sugano, Kobe (JP); Satoshi Maekawa, Kobe (JP); Takayuki Igaue, Kobe (JP)

(73) Assignee: Kobe Steel, Ltd., Hyogo (JP)

( * ) Notice: Subject to any disclaimer, the term of this patent is extended or adjusted under 35 U.S.C. 154(b) by 0 days.

(21) Appl. No.: 16/446,852

(22) Filed: Jun. 20, 2019

(65) Prior Publication Data

US 2020/0011452 A1      Jan. 9, 2020

(30) Foreign Application Priority Data

Jul. 9, 2018   (JP) ................. 2018-130109

(51) Int. Cl.
*F16K 31/40*   (2006.01)
*F16K 39/02*   (2006.01)
*G05D 7/06*    (2006.01)
*F25B 41/06*   (2006.01)

(52) U.S. Cl.
CPC .......... *F16K 31/406* (2013.01); *F16K 39/024* (2013.01); *F25B 41/06* (2013.01); *G05D 7/0635* (2013.01)

(58) Field of Classification Search
CPC ... F16K 31/406; F16K 39/024; G05D 7/0635; F25B 41/06
USPC ........................... 251/30.01–30.04
See application file for complete search history.

(56) References Cited

U.S. PATENT DOCUMENTS

| | | | | |
|---|---|---|---|---|
| 4,494,726 A | * | 1/1985 | Kumar | F16K 31/408 251/29 |
| 4,746,093 A | * | 5/1988 | Scanderbeg | F15B 13/015 251/30.04 |
| 7,621,211 B2 | * | 11/2009 | Ma | E02F 9/2207 251/30.04 |
| 8,424,836 B2 | * | 4/2013 | Ma | F16K 31/406 251/30.03 |
| 8,870,152 B2 | * | 10/2014 | Nagata | F16K 31/408 251/30.04 |

(Continued)

FOREIGN PATENT DOCUMENTS

| | | |
|---|---|---|
| JP | 2007-239996 A | 9/2007 |
| JP | 2013-130271 A | 7/2013 |

*Primary Examiner* — Umashankar Venkatesan
(74) *Attorney, Agent, or Firm* — Studebaker & Brackett PC

(57) ABSTRACT

Provided is an electrically-driven flow rate control valve capable of controlling a flow rate of fluid while application of a high pressure of the fluid to a sub valve body connected to an electric motor is suppressed. A flow rate control valve includes a casing, an elevation drive device, and a main valve body. When the sub valve body moves upward by the elevation drive device, oil in a back pressure chamber is discharged. Moreover, the oil in a first oil chamber flows into the back pressure chamber while the flow rate of the oil is regulated. A balance among pressures in the back pressure chamber, the first oil chamber, and the second oil chamber changes, and the main valve body opens. When the main valve body is closed, a direct application of the pressure of the back pressure chamber to the sub valve body is blocked.

9 Claims, 9 Drawing Sheets

(56) References Cited

U.S. PATENT DOCUMENTS

2004/0195532 A1* 10/2004 Barber ................ F15B 13/0433
                                                        251/30.02
2007/0210270 A1    9/2007 Stephenson et al.
2007/0290151 A1* 12/2007 Muller ............... G05D 16/2097
                                                           251/26
2007/0290152 A1* 12/2007 Ma ........................ F16K 31/406
                                                        251/30.01

* cited by examiner

ELECTRICALLY-DRIVEN FLOW RATE CONTROL VALVE

BACKGROUND OF THE INVENTION

Field of the Invention

The present invention relates to an electrically-driven flow rate control valve capable of controlling a flow rate of fluid.

Description of the Related Art

Hitherto, there is known an electrically-driven flow rate control valve as a device that controls a flow rate of hydraulic fluid such as hydraulic oil and refrigerant in a flow path for the hydraulic fluid. The electrically-driven flow rate control valve includes a casing, a main valve body movable in the casing, a drive source for generating a driving force for moving the main valve body, and a sub valve body for receiving the driving force of the drive source to transmit a moving force to the main valve body. A reception port and a discharge port are formed in the casing, and these ports communicate with each other via a communication port. The main valve body is movable between a shut-off position for shutting off the communication port and an open position for opening the communication port.

An electrically-driven valve serving as an electrically-driven flow rate control valve as described before is disclosed in JP2013-130271A. This electrically-driven valve includes a valve main body, a valve body, an elevation drive mechanism, and an opening spring. The valve main body includes a valve chamber, a first inlet/outlet port directed horizontally and opened in the valve chamber, a valve port with a valve seat directed vertically, and opened in the valve chamber, and a second inlet/outlet port continuing to the valve port. The valve body is arranged in the valve chamber so as to be capable of moving up/down, thereby opening/closing the valve port. The elevation drive mechanism includes an electric motor for moving up/down the valve body. The opening spring energizes the valve body toward an opening direction. A port diameter of the valve port and a chamber diameter of a back pressure chamber defined above the valve body are set to be approximately the same, and a pressure equalization path opened at a bottom end surface is simultaneously provided in the valve body so as to cause the valve port and the back pressure chamber to communicate with each other. Moreover, dimensions of respective portions are set so that a value obtained by dividing an area of the bottom end opening of the pressure equalization path by an area of the valve port is equal to or more than 0.5, and less than 1.0.

Moreover, a pilot operated valve is disclosed in JP2007-239996A, This valve includes a main body, a main poppet valve, a pilot piston, a first disc spring, a pilot valve element, and an actuator. The main body includes a first port, a second port, and a valve seat arranged between the first port and the second port. The main poppet valve selectively engages with the valve seat to form a control chamber. A pressure in the control chamber controls a movement of the main poppet valve. The main poppet valve includes an opening portion causing the second port and the control chamber to communicate with each other. The pilot piston is movably received in the opening portion of the main poppet valve, and internally includes a pilot path. The first disc spring biases the pilot piston with respect to the main poppet valve. The pilot valve element operates so as to open/close the pilot path. The actuator is operably coupled to the pilot valve element so as to move the pilot valve element.

In the electrically-driven valve described in JP2013-130271A, the valve body needs to be maintained at a predetermined position by a driving force generated by the electric motor. Therefore, when a pressure of the fluid flowing between the first inlet/outlet port and the second inlet/outlet port increases, the driving force for maintaining the valve body increases in proportion to the pressure. As a result, there poses such a problem that a high electric power is necessary for maintaining the valve body. On the other hand, in the pilot operated valve described in JP2007-239996A, a position of the pilot valve element is controlled by the first disc spring and the actuator. Therefore, a precision of the position of the valve element likely varies due to hysteresis of the devices such as the spring and the actuator. Further, a pressure of the oil at the first inlet/outlet port or the second inlet/outlet port directly acts on the pilot valve element when the valve is closed depending on a direction of the flow of the oil. Therefore, a large driving force is required for the actuator in order to maintain the pilot valve element in the closed state, and there thus poses such a problem that a consumed electric power increases.

SUMMARY OF THE INVENTION

The present invention has been made in view of the above-mentioned problem, and has an object of providing an electrically-driven flow rate control valve capable of controlling the flow rate of fluid while application of a high pressure of the fluid to a sub valve body connected to an electric motor is suppressed.

An electrically-driven flow rate control valve includes a casing including a first fluid chamber, a second fluid chamber, a fluid-chamber communication port for causing the first fluid chamber and the second fluid chamber to communicate with each other, and a cylinder portion, where a reception port capable of receiving a fluid from an outside of the casing into the first fluid chamber and a discharge port capable of discharging the fluid from the second fluid chamber to the outside of the casing are formed on the casing, an electric motor, a main valve body, which is stored in the cylinder portion so as to be movable between a main-valve-body open position and a main-valve-body sealing position along a predetermined axial direction, forms a back pressure chamber which the fluid can enter into/exit from between the main valve body and the cylinder portion, and includes a main-valve-body distal end portion capable of sealing the fluid-chamber communication port and a main-valve-body base end portion facing the back pressure chamber on an opposite side of the main-valve-body distal end portion in the axial direction, where the main-valve-body distal end portion opens the fluid-chamber communication port, thereby permitting communication of the fluid between the first fluid chamber and the second fluid chamber when the main valve body is arranged at the main-valve-body open position, and the main-valve-body distal end portion seals the fluid-chamber communication port, thereby shutting off the communication of the fluid between the first fluid chamber and the second fluid chamber when the main valve body is arranged at the main-valve-body sealing position, a communication path capable of causing the first fluid chamber and the back pressure chamber to communicate with each other, a flow-rate regulating mechanism, which is arranged in the communication path, and regulates a flow rate of the fluid so as to reduce the flow rate of the fluid flowing from the first fluid chamber toward the back pressure chamber, and a sub valve body which is stored in the back pressure chamber, includes a sub-valve-body flow path communicating with the outside of the casing and sub-valve-body communication port causing the back pressure chamber and the sub-valve-body flow path to communicate with each other, receives a driving force generated by the electric motor, thereby being capable of relatively moving along the axial direction with respect to the main valve body between a sub-valve-body opening position and a sub-valve-body sealing position, opens the sub-valve-body communication port, thereby permitting the fluid in the back pressure chamber to be discharged via the sub-valve-body flow path to the outside of the casing when the sub valve body is arranged at the sub-valve-body opening position, and seals the sub-valve-body communication port, thereby shutting off the communication of the fluid between the back pressure chamber and the sub-valve-body flow path when the sub valve body is arranged at the sub-valve-body sealing position, where the main valve body has such a shape as satisfying a relationship of AS<AT where AS is an area of the main-valve-body distal end portion projected in the axial direction, and AT is an area of the main-valve-body base end portion projected in the axial direction.

With this configuration, the position (opening/closing operation) of the main valve body can precisely be controlled through the position control for the sub valve body by the electric motor. Moreover, the flow-rate regulating mechanism is arranged in the communication path. Therefore, a direct application of a high pressure in the first fluid chamber to the sub valve body is suppressed, and a pressure required for the drive of the main valve body is supplied to the backpressure chamber. As a result, drive of the sub valve body against the pressure is not necessary, and the electric motor only needs to generate the driving force for moving the sub valve body relatively to the main valve body. Therefore, reductions in electric power consumption, output, and size of the electrically-driven flow rate control valve are realized. Further, the main valve body has such a shape as satisfying the relationship of AS<AT. Therefore, when the main valve body moves from the main-valve-body open position to the main-valve-body sealing position, the force acting on the main valve body can be set to a main-valve-body sealing position side by a differential pressure between the first fluid chamber and the back pressure chamber. Therefore, an energizing member for closing the main valve body does not always need to be provided, and the main valve body can stably be maintained at the main-valve-body sealing position. As a result, a consumed electric power for resisting against an energizing force of the energizing member can be suppressed in the electric motor, and the number of components of the electrically-driven flow rate control valve can simultaneously be reduced.

In the configuration described before, the main valve body includes a first valve-body portion including the main-valve-body base end portion, and a second valve-body portion including the main-valve-body distal end portion, where the maximum dimension of the first valve-body portion in a cross section orthogonal to the axial direction is preferably set to be larger than the maximum dimension of the second valve-body portion in the cross section so as to satisfy the relationship of AS<AT.

With this configuration, the main valve body includes the first valve-body portion and the second valve-body portion, and the relationship of AS<AT can thus easily be satisfied.

The configuration described before preferably further includes a sub fluid chamber defined by a step portion between the first valve-body portion and the second valve-body portion and the cylinder portion, where a part of the sub fluid chamber is opened so as to be capable of internally receiving the fluid while extending as the main valve body moves from the main-valve-body sealing position to the main-valve-body open position.

With this configuration, the movement of the main valve body is smoothly realized compared with a case in which the sub fluid chamber is sealed. Moreover, if the fluid has predetermined lubricity as oil or the like, the movement of the main valve body is further smoothly realized by the inflow of the fluid into the sub fluid chamber.

The configuration described before preferably further includes a discharge flow path, which communicates with the sub-valve-body flow path, and leads the fluid having flown from the back pressure chamber into the sub-valve-body flow path to the outside of the casing, and a sub communication path, which causes the discharge flow path and the sub fluid chamber to communicate with each other.

With this configuration, the fluid flowing into the discharge flow path can be used to cause the fluid to flow into the sub fluid chamber.

In the configuration described before, the fluid-chamber communication port preferably has a circular shape as viewed along the axial direction, and the main-valve-body distal end portion preferably has a conical shape capable of sealing the fluid-chamber communication port along the axial direction.

With this configuration, inflow/outflow of the fluid can stably be blocked over an entirety in a peripheral direction of the main-valve-body distal end portion by driving the main valve body so that the main-valve-body distal end portion enters into the fluid-chamber communication port.

In the configuration described before, the main valve body preferably includes an inner space, which communicates with the back pressure chamber on an opposite side of the main-valve-body distal end portion, and is formed into a tubular shape along the axial direction, and into which the sub valve body can enter, and a distal-end inner wall portion defining a side of the main-valve-body distal end portion of the inner space, the sub valve body preferably includes a cylindrical portion arranged at least at an end portion of a side of the distal-end inner wall portion, and the sub-valve-body communication port is simultaneously opened in the cylindrical portion, and the distal-end inner wall portion preferably includes a recessed portion, which permits the cylindrical portion of the sub valve body to enter, and is simultaneously brought into close contact with an entirety in the peripheral direction of the cylindrical portion.

With this configuration, a discharge of the fluid from the back pressure chamber to the sub-valve-body flow path can be blocked by entering the cylindrical portion of the sub valve body into the recessed portion of the main valve body Moreover, the sub-valve-body communication port is opened on the cylindrical portion of the sub valve body and the pressure in the back pressure chamber is thus less likely applied to the sub-valve-body communication port. Therefore, consumption of a high electric power for maintaining the position of the sub valve body in the valve closed state is suppressed.

In the configuration described before, the sub-valve-body communication port is preferably opened on an end surface crossing the axial direction of the cylindrical portion of the sub valve body.

With this configuration, the discharge of the fluid from the back pressure chamber to the sub-valve-body flow path can stably be blocked by pressing a bottom end portion of the cylindrical portion of the sub valve body against the recessed portion of the main valve body.

In the configuration described before, the recessed portion of the distal-end inner wall portion is formed into a conical shape, and an inclined surface of the recessed portion is in close contact with an entirety in the peripheral direction of a peripheral edge of the end surface of the cylindrical portion when the sub valve body is arranged at the sub-valve-body sealing position.

With this configuration, the discharge of the fluid from the back pressure chamber to the sub-valve-body flow path can stably be blocked by pressing a bottom end portion of the cylindrical portion of the sub valve body against the recessed portion of the main valve body.

In the configuration described before, the sub-valve-body communication port is preferably opened on a side surface extending along the axial direction of the cylindrical portion of the sub valve body, the recessed portion is preferably formed into a cylindrical shape so that the cylindrical portion can enter, and the sub-valve-body communication port is preferably arranged at such a position of the cylindrical portion that the sub-valve-body communication port is sealed when the cylindrical portion enters into the recessed portion as the sub valve body moves, and the sub-valve-body communication port communicates with the back pressure chamber when the cylindrical portion separates from the recessed portion as the sub valve body moves.

With this configuration, a discharge of the fluid from the back pressure chamber to the sub-valve-body flow path can be blocked by entering the cylindrical portion of the sub valve body into the recessed portion of the main valve body. Moreover, an opening area of the sub-valve-body communication port is regulated in accordance with a relative movement of the sub valve body with respect to the main valve body, and an opening/closing operation of the main valve body can thus precisely be controlled.

Effect of the Invention

According to the present invention, provided is an electrically-driven flow rate control valve capable of controlling the flow rate of the fluid while the application of a high pressure of the fluid to the sub valve body connected to the electric motor is suppressed.

DESCRIPTION OF THE PREFERRED EMBODIMENTS

Figure 1:
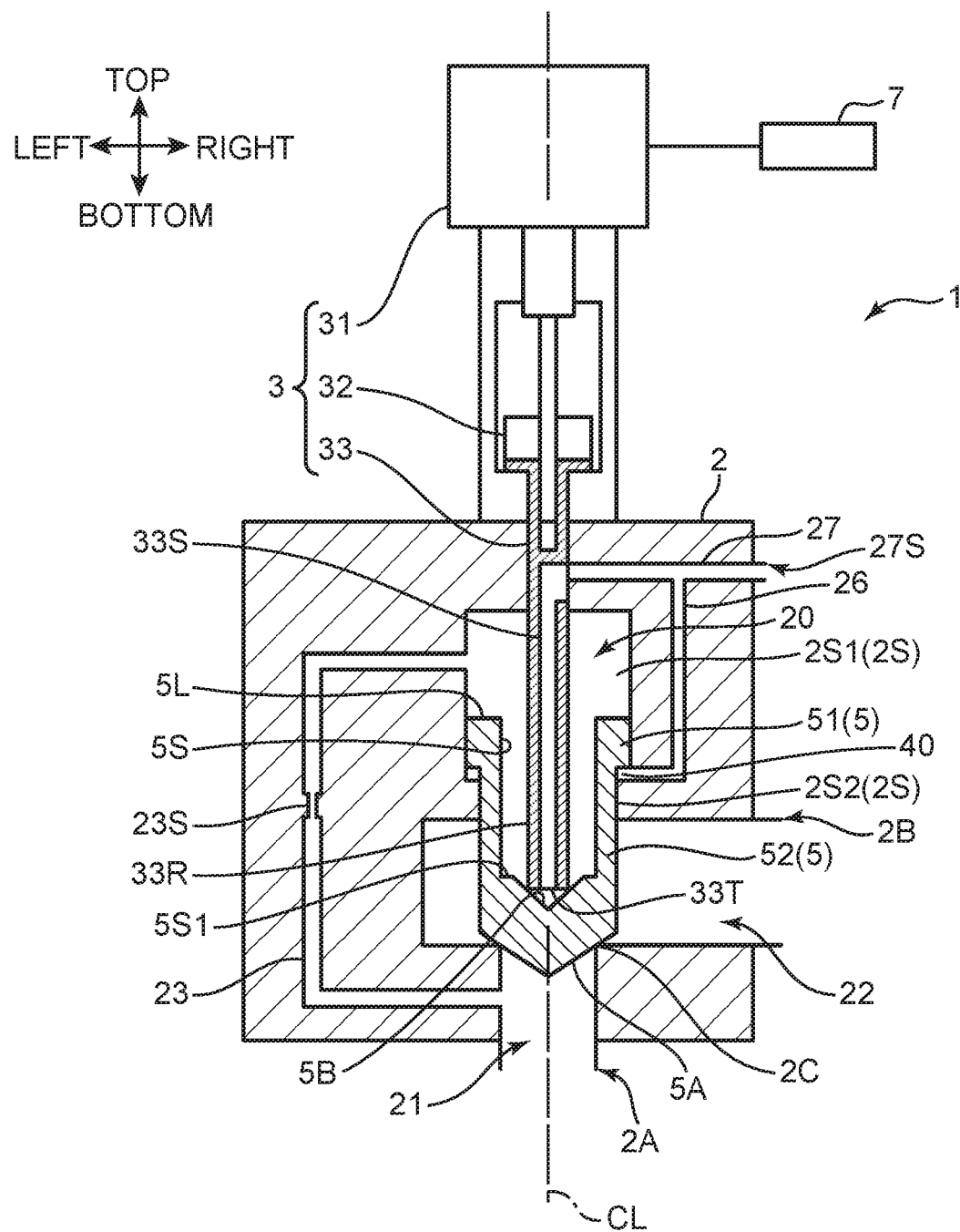
FIG. 1 is a cross sectional view of an electrically-driven flow rate control valve according to an embodiment of the present invention.
Figure 2:
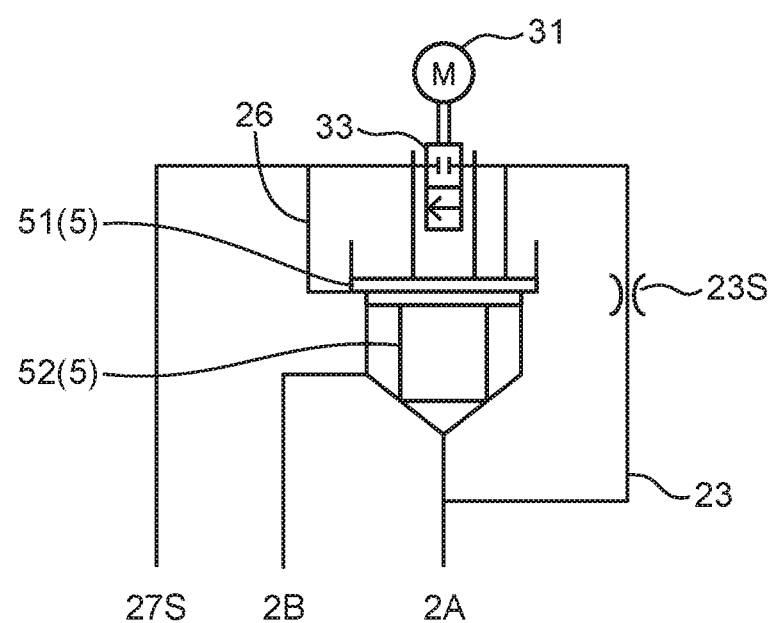
FIG. 2 is a hydraulic circuit diagram of the electrically-driven flow rate control valve in FIG. 1.

A description will now be given of an embodiment of the present invention referring to drawings. FIG. 1 is a cross sectional view of a flow rate control valve 1 (electrically-driven flow rate control valve) according to this embodiment. FIG. 2 is a hydraulic circuit diagram of the flow rate control valve 1 in FIG. 1. It should be noted that although directions "top", "bottom", "left", and "right" are indicated in respective drawings hereinafter, these directions are indicated for the sake of description of a structure of the flow rate control valve 1 according to this embodiment, and are lot intended to restrict an application form of the electrically-driven control valve according to the present invention. The flow rate control valve 1 according to this embodiment is configured to control a flow of hydraulic oil, and is used for a hydraulic circuit for a construction machine as an example.

With reference to FIG. 1, the flow rate control valve 1 includes a casing 2, an elevation drive device 3, and a main valve body 5. The elevation drive device 3 includes an electric motor 31, a rotational elevation machine 32, and a sub valve body 33. In the flow rate control valve 1, the main valve body 5 is moved by driving the elevation drive device 3 to cause a first port 2A and a second port 213 formed in the casing 2 to communicate with each other, thereby controlling a flow rate of the hydraulic oil flowing from the first port 2A toward the second port 2B.

The casing 2 stores or holds respective members of the flow rate control valve 1. The casing 2 has an approximately rectangular solid shape in this embodiment. The casing 2 includes a first oil chamber 21 (first fluid chamber), a second oil chamber 22 (second fluid chamber), an oil-chamber communication port 2C (fluid-chamber communication port), and a cylinder portion 2S. The first oil chamber 21 and the second oil chamber 22 permit internal storage of the hydraulic oil (fluid). The first oil chamber 21 is formed in a bottom portion of the casing 2. The first oil chamber 21 is formed into a cylindrical shape (circular column shape) about a center axis CL extending in a top/bottom direction in this embodiment. The second oil chamber 22 is arranged above the first oil chamber 21. The second oil chamber 22 has a rectangular solid shape extending horizontally. It should be noted that although the second oil chamber 22 is separated into a left part and a right part with respect to the main valve body 5 in FIG. 1, these parts communicate with each other via parts adjacent to the main valve body 5 in a front/rear direction (a direction orthogonal to the page of FIG. 1). The cylinder portion 2S is a space portion in a cylindrical shape formed in the casing 2 so that the main valve body 5 can reciprocate (move up/down). The cylinder portion 2S includes a first cylinder portion 2S1 and a second cylinder portion 2S2 in this embodiment. The first cylinder portion 2S1 constitutes a top part of the cylinder portion 2S, and the second cylinder portion 2S2 constitutes a bottom part of the cylinder portion 2S. An inner diameter of the first cylinder-portion 2S1 is set to be larger than an inner diameter of the second cylinder portion 2S2. A first valve-body portion 51 of the main valve body 5 described later is movably stored in the first cylinder portion 2S1, and a second valve-body portion 52 of the main valve body 5 described later is movably stored in the second cylinder portion 2S2.

The oil-chamber communication port 2C is formed in a top end portion of the first oil chamber 21, in other words, in a bottom end portion (bottom portion) of the second oil chamber 22, and causes the first oil chamber 21 and the second oil chamber 22 to communicate with each other. The oil-chamber communication port 2C has a circular shape as viewed along the center axis CL. Moreover, a first port 2A (reception port) and a second port 2B (discharge port) are respectively formed on a bottom surface portion and a right-side surface portion of the casing 2. The first port 2A can receive the hydraulic oil from the outside of the casing 2 into the first oil chamber 21. Similarly the second port 2B can discharge the hydraulic oil from the second oil chamber 22 to the outside of the casing 2.

The electric motor 31 is controlled by a control unit 7, and is rotatable toward a first rotation direction and a second rotation direction opposite to the first rotation direction about the center axis CL in this embodiment.

The rotational elevation machine 32 is coupled to an output shaft of the electric motor 31, is simultaneously coupled to the sub valve body 33, and converts a rotation force generated by the electric motor 31 in a moving force in an axial direction. As a result, when the electric motor 31 rotates, the sub valve body 33 moves along the top/bottom direction (moves up/down). As an example, the rotational elevation machine 32 includes a publicly-known ball screw mechanism, and simultaneously includes precise speed reduction gears internally.

The main valve body 5 has a cylindrical shape opened a top end portion. The main valve body 5 includes a first valve-body portion 51 including a main-valve-body base end portion 5L, a second valve-body portion 52 including a main-valve-body distal end portion 5A, a cylindrical space 5S (innerspace), and a distal-end inner wall portion 5S1. The first valve-body portion 51 constitutes a top part of the main valve body 5, and the second valve-body portion 52 constitutes a bottom part of the main valve body 5. The main-valve-body distal end portion 5A is a distal end portion of the main valve body 5, has a conical shape tapering downward, and can seal the oil-chamber communication port 2C from above. The main-valve-body base end portion 5L is a base end portion of the main valve body 5, and is arranged so as to face a back pressure chamber 20, described later, on an opposite side of the main-valve-body distal end portion 5A in the axial direction. The cylindrical space 5S is constituted by the first valve-body portion 51 and the second valve-body portion 52, and corresponds to a tubular inside of the cylindrical main valve body 5. Moreover, the cylindrical space 5S communicates with the back pressure chamber 20 on the opposite side of the main-valve-body distal end portion 5A in the axial direction, and is formed into a tubular shape along the axial direction. The sub valve body 33 can enter into the cylindrical space 5S as shown in FIG. 1. The distal-end inner wall portion 5S1 is a part of an inner wall portion of the main valve body 5, and defines an end surface (a bottom surface of the cylindrical space 5S) on the main-valve-body distal end portion 5A side of the cylindrical space 5S. The distal-end inner wall portion 5S1 includes a distal-end recessed portion 5B in this embodiment. The recessed portion 5B permits entrance of a cylindrical portion 33R of the sub valve body 33, and simultaneously comes in close contact with an entirety in a peripheral direction of the cylindrical portion 33R as described later. Particularly, the recessed portion 5B is formed into a conical shape about the center axis CL as shown in FIG. 1 in this embodiment, and an inclined surface of the recessed portion 5B comes in close contact with an entirety in the peripheral direction of a peripheral edge of the end surface of the cylindrical portion 33R of the sub valve body 33.

Figure 3:
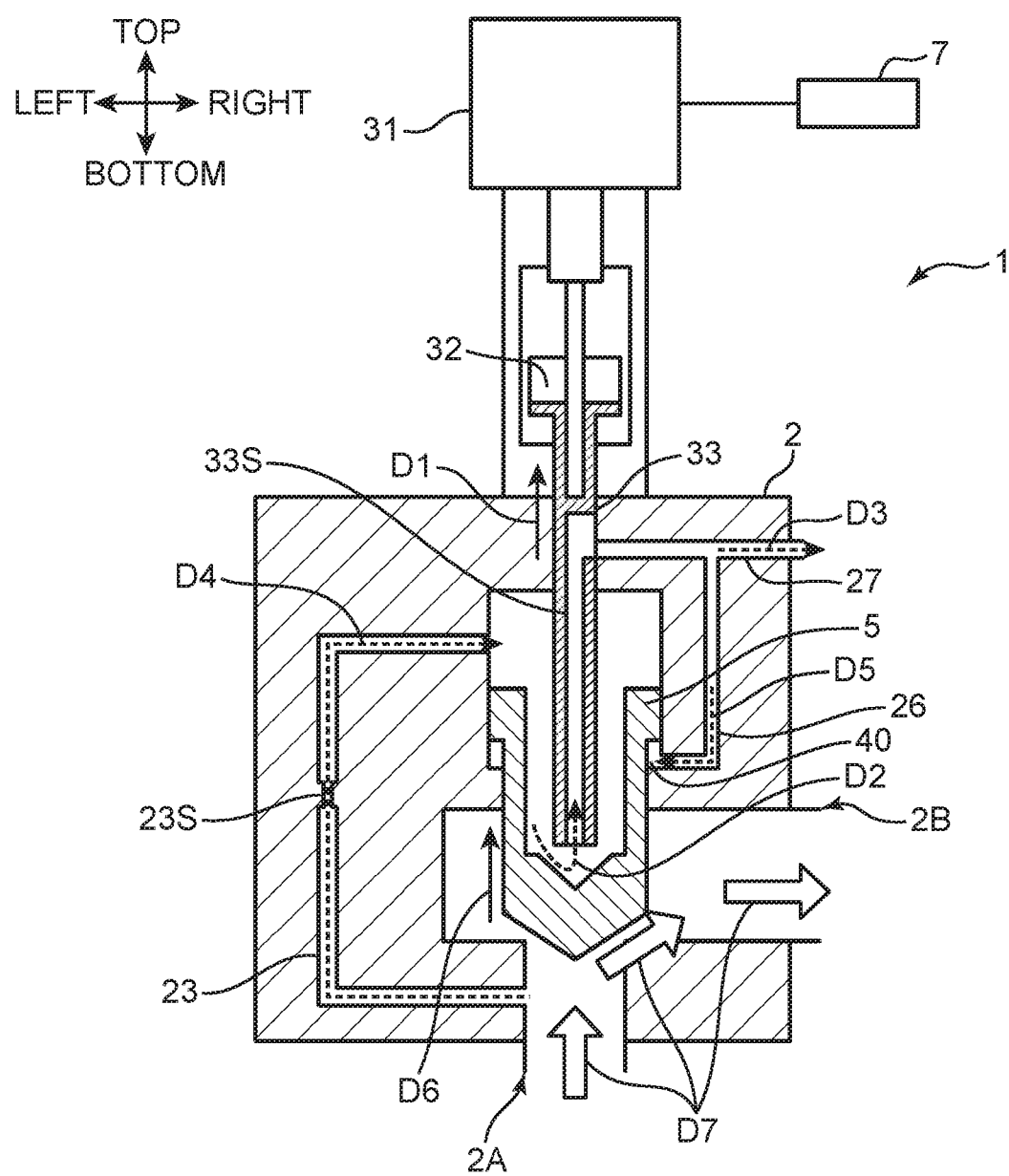
FIG. 3 is a cross sectional view of a state of opening of a main valve body of the electrically-driven flow rate control valve in FIG. 1.

The main valve body 5 is stored in the cylinder portion 2S so as to be movable between a main-valve-body open position (FIG. 3) and a main-valve-body sealing position (FIG. 1) along the center axis CL (predetermined axial direction). Moreover, as shown in FIG. 1, the main valve body 5 forms the back pressure chamber 20, which the hydraulic oil can enter into/exit from, between the main valve body 5 and the cylinder portion 2S. When the main valve body 5 is arranged at the main-valve-body open position, an outer distal end portion 5A opens the oil-chamber communication port 2C to permit the communication of the hydraulic oil between the first oil chamber 21 and the second oil chamber 22. Moreover, when the main valve body 5 is arranged at the main-valve-body sealing position, the outer distal end portion 5A seals the oil-chamber communication port 2C from above to shut off the communication of the hydraulic oil between the first oil chamber 21 and the second oil chamber 22. When the main valve body 5 moves upward, a volume of the back pressure chamber 20 decreases, and when the main valve body 5 moves downward, the volume of the back pressure chamber 20 increases. The flow rate control valve 1 further includes a sub fluid chamber 40 as shown in FIG. 1, The sub fluid chamber 40 is a space defined by a step portion between the first valve-body portion 51 and the second valve-body portion 52 and the cylinder portion 2S. As the main valve body 5 moves from the main-valve-body sealing position to the main-valve-body open position, a part of the sub fluid chamber 40 is opened so as to be capable of internally receiving the hydraulic oil while extending. The sub fluid chamber 40 is opened so that the sub fluid chamber 40 communicates with a sub supply oil path 26 described later in this embodiment. Thus, when the sub fluid chamber 40 extends as shown in FIG. 3 from the state shown in FIG. 1, the hydraulic oil flows from the discharge oil path 27 via the sub supply oil path 26 into the sub fluid chamber 40. On this occasion, the hydraulic oil flows into the sub supply oil path 26 from the back pressure chamber 20 or the outside (discharge port 27S) of the casing 2.

Further, a supply oil path 23 (communication path), the sub supply oil path 26, and the discharge oil path 27 are formed in the casing 2. The supply oil path 23 is an oil path that can cause the first oil chamber 21 and the back pressure 20 to communicate with each other. The discharge oil path 27 leads the hydraulic oil discharged from the back pressure chamber 20 via the sub valve body 33 to the outside of the casing 2 as described later. A discharge port 27S is arranged in a terminal part of the discharge oil path 27 out of the casing 2. The sub supply oil path 26 is an oil path branching between the sub-valve-body oil path 33S of the sub valve body 33 and the discharge port 27S, and causes the discharge oil path 27 and the sub fluid chamber 40 to communicate with each other.

Moreover, the supply oil path 23 includes an orifice 23S (flow-rate regulating mechanism) as shown in FIG. 1. The orifice 23S is arranged between the first oil chamber 21 and the back pressure chamber 20. The orifice 23S generates a pressure loss in the supply oil path 23, and regulates a flow rate of the hydraulic oil so as to reduce the flow rate of the hydraulic oil flowing from the first oil chamber 21 toward the back pressure chamber 20. A pressure of the fluid required to drive the main valve body 5 can be supplied to the back pressure chamber 20, and a supply of an excessive pressure to the back pressure chamber 20 can simultaneously be suppressed by the orifice 23S.

The sub valve body 33 is stored in the back pressure chamber 20 and the cylindrical space 5S of the main valve body 5. The sub valve body 33 is formed of a circular pipe member linearly extending on the center line CL in this embodiment. In other words, the sub valve body 33 includes the cylindrical portion 33R arranged at least in a distal end portion (bottom end portion, end portion on a distal-end inner wall portion 5S1 side). A top end portion of the sub valve body 33 is connected to the rotational elevation machine 32. The sub valve body 33 includes a sub-valve-body oil path 33S (sub-valve-body flow path) and the sub-valve-body communication port 33T. The sub-valve-body oil path 33S is an oil path extending in the top/bottom direction inside the sub valve body 33. A top end portion of the sub-valve-body oil path 33S communicates with the first discharge oil path 27. The sub-valve-body communication port 33T opens on a bottom end surface (end surface) of the cylindrical portion 33R of the sub valve body 33. The sub-valve-body communication port 33T causes the back pressure chamber 20 and the sub-valve-body oil path 33S to communicate with each other, The sub valve body 33 receives the driving force generated by the electric motor 31 so as to be capable of moving relatively to the main valve body 5 along the axial direction between a sub-valve-body open position and a sub-valve-body sealing position. When the sub valve body 33 is arranged at the sub-valve-body open position, the bottom end portion (cylindrical portion 33R) of the sub valve body 33 separates upward from the distal-end inner wall portion 5S1 of the main valve body 5. As a result, the sub valve body 33 opens the sub-valve-body communication port 33T, to permit the hydraulic oil in the back pressure chamber 20 to be discharged via the sub-valve-body oil path 33S and the discharge oil path 27 to the outside of the casing 2. On the other hand, when the sub valve body 33 is arranged at the sub-valve-body sealing position, the bottom end portion of the sub valve body 33 abuts against the entirety in the peripheral direction of the inclined surface part of the recessed portion 5B of the main valve body 5. As a result, the sub valve body 33 seals the sub-valve-body communication port 33T to shut off the communication of the hydraulic oil between the back pressure chamber 20 and the sub-valve-body oil path 33S.

Figure 4:
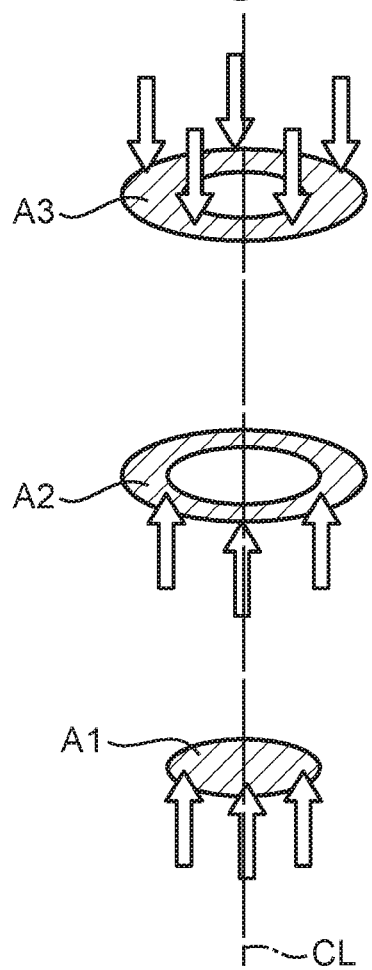
FIG. 4 is a schematic view of forces applied to the main valve body of the electrically-driven flow rate control valve in FIG. 1.
Figure 5:
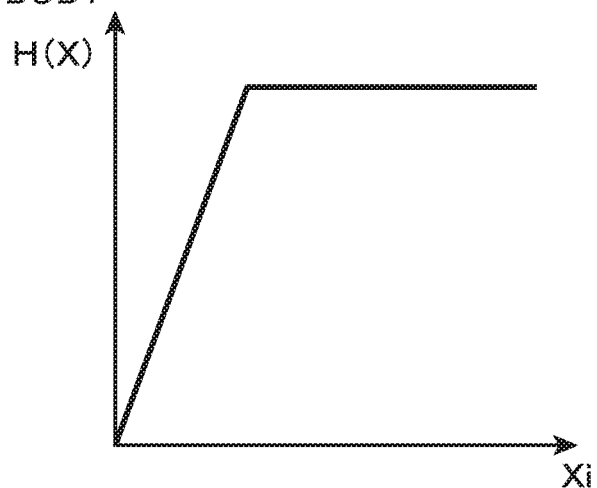
FIG. 5 is a graph of a relationship of an area of an opening of a sub valve body with respect to a relative distance Xi between the main valve body and the sub valve body in the electrically-driven flow rate control valve in FIG. 1.

FIG. 3 is a cross sectional view of the state of the opening of the main valve body 5 of the flow rate control valve 1 in FIG. 1. FIG. 4 is a schematic view of forces applied to the main valve body 5 of the flow rate control valve 1 in FIG. 1. FIG. 5 is a graph of a relationship of an area of the opening between the sub valve body 33 and the main valve body 5 with respect to a relative distance Xi between the main valve body 5 and the sub valve body 33 in the flow rate control valve 1 in FIG. 1.

The electric motor 31 controlled by the control unit 7 carries out rotational drive as a drive source in this embodiment. The rotational elevation machine 32 can convert a rotational motion and a translational motion, converts a rotational motion of the electric motor 31 to a translational motion (in the top/bottom direction in FIG. 1), and translates together with the sub valve body 33 coupled to the rotational elevation machine 32. Then, the main valve body 5 translates in operationally associated with the motion of the sub valve body 33, thereby changing an area of the opening between the first oil chamber 21 and the second oil chamber 22 in the oil-chamber communication port 2C, and a flow rate of the hydraulic oil is regulated. A description will now be given of an operation principle of the flow rate control valve 1.

Referring to FIG. 4, a description will now be given of the forces applied to the main valve body 5. In the state in which the main-valve-body distal end portion 5A of the main valve body 5 is sealing the oil-chamber communication port 2C, a pressure reception area (an area projected in a direction parallel with the center axis CL) on a first oil chamber 21 side of the main-valve-body distal end portion 5A is defined as A1, and a pressure reception area on a second oil chamber 22 side of the main-valve-body distal end portion 5A is defined as A2. An entire pressure reception area of the main-valve-body distal end portion 5A is defined as AS (AS=A1+A2). Moreover, a pressure reception area on a side of the top end portion of the main valve body 5, namely a side of the back pressure chamber 20, is defined as A3 (also referred to as AT). It should be noted that shapes of the first valve-body portion 51 and the second valve-body portion 52 of the main valve body 5 are set so that a relationship of AS<AT is satisfied. Particularly, the maximum dimension of the first valve-body portion 51 in a cross section orthogonal to the axial direction of the center axis CL is set to be larger than the maximum dimension of the second valve-body portion 52 in the cross section so as to satisfy the relationship of AS<AT. Further, the pressure in the first oil chamber 21 is defined as P1, the pressure in the second oil chamber 22 is defined as P2, and the pressure in the back pressure chamber 20 is defined as P3. Moreover, in the axial direction parallel with the center axis CL, a stroke (displacement amount) of the main valve body 5 is defined as X, a stroke of the sub valve body 33 is defined as Xr, and the relative stroke (relative displacement amount) of the sub valve body 33 with respect to the main valve body 5 is defined as Xi (=X−Xr). Moreover, the opening area of the main valve body 5 opening the oil-chamber communication port 2C is defined as G(X), and the opening area between the sub valve body 33 and the main valve body 5, which is formed in the bottom end portion of the sub valve body 33, is defined as H(Xi). The opening areas G(X) and H(Xi) are respectively functions of the strokes X and Xi. Moreover, an opening area of the orifice 23S set in advance is defined as Am. Further, a passing flow rate of the hydraulic oil from the first oil chamber 21 to the second oil chamber 22 via the oil-chamber communication port 2C is defined a Q1, and a passing flow rate of the hydraulic oil from the back pressure chamber 20 to the discharge port 27S via the sub-valve-body communication port 33T is defined as Q2.

In consideration of a balance among the forces acting on the main valve body 5 in the axial direction, forces Fa and Fb applied to the main valve body 5 by the hydraulic oil toward an opening direction (the top direction in FIG. 1) can be given by Expression 1 and Expression 2.

$$Fa = P1 \times A1 \qquad \text{(Expression 1)}$$

$$Fb = P2 \times A2 \qquad \text{(Expression 2)}$$

Similarly a force Fc applied to the main valve body 5 by the hydraulic oil toward a closing direction (the bottom direction FIG. 1) can be given by Expression 3.

$$Fc = P3 \times A3 \quad \text{(Expression 3)}$$

Moreover, a force F acting on the main valve body 5 can be given by Expression 4, $$F = Fa + Fb - Fc \quad \text{(Expression 4)}$$

From Expression 4, when F=0, the main valve body 5 is stationary. Moreover, when F>0, the main valve body 5 moves toward the opening direction, and when F<0, the main valve body 5 moves toward the closing direction.

A description will now be given of an operation of opening the main valve body 5 when the pressure in the first oil chamber 21 is higher than the pressure in the second oil chamber 22.

<In case of initial state (X=0)>

In the valve closed state in which the main valve body 5 is sealing the oil-chamber communication port 2C, both the strokes of the main valve body 5 and the sub valve body 33 are 0. That is, Expression 5 holds true.

$$X=0, \; Xr=0, \; Xi=X-Xr=0 \quad \text{(Expression 5)}$$

In this case, the opening area H(X) of the sub valve body 33 is 0 as shown in FIG. 5, and the flow rate Q2 of the hydraulic oil discharged from the discharge port 27S is also 0. On this occasion, the flow rate Q2 of the hydraulic oil discharged from the discharge port 27S is equal to a flow rate of the hydraulic oil flowing from the first oil chamber 21 into the back pressure chamber 20. Moreover, a flow rate of the hydraulic oil passing through the orifice 23S is also 0, and the pressure in the first oil chamber 21 and the pressure in the back pressure chamber 20 are thus equal to each other (P1=P3). Therefore, Expression 4 can be replaced by Expression 6.

$$F = P1 \times A1 + P2 \times A2 \times P3 \times A3 < 0 \quad \text{(Expression 6)}$$

That is, regardless of the pressures in the first oil chamber 21 and the second oil chamber 22, the main valve body 5 is always pressed against the oil-chamber communication port 2C, and the flow of the hydraulic oil from the first oil chamber 21 to the second oil chamber 22 can be shut off. On this occasion, the sub valve body 33 only needs to be pressed against the main valve body 5 so as to maintain the relative position therebetween to be constant, the electric motor 31 does not consume electric power, and the flow between the first oil chamber 21 and the second oil chamber 22 can be shut off.

<About Valve Opening Operation>

When the electric motor 31 is rotated by the control unit 7 to move the sub valve body 33 upward from the initial state, a relative position between the main valve body 5 and the sub valve body 33 changes. As a result, a gap is formed between the bottom end portion of the sub valve body 33 and the recessed portion 5B of the main valve body 5, and the hydraulic oil in the back pressure chamber 20 is discharged from the sub-valve-body communication port 33T via the sub-valve-body oil path 33S and the discharge oil path 27. That is, the flow rate Q2 passing through the discharge oil path 27 is generated. As a result, the hydraulic oil at the flow rate Q2 flows from the first oil chamber 21 into the back pressure chamber 20. On this occasion, the hydraulic oil at the flow rate Q2 passes through the orifice 23S, and Expression 7 is thus satisfied.

$$Q2 = C \times Am \sqrt{(P1-P3)} = C \times H(Xi)\sqrt{(P3)} \quad \text{(Expression 7)}$$

It should be noted that C is a flow coefficient determined from a shape of the orifice 23S and fluid specifications. Expression 8 is derived from Expression 7.

$$P3 = Am^2/(H(Xi)^2 + Am^2) \times P1 \quad \text{(Expression 8)}$$

On the other hand, Expression 4 can be expressed as Expression 9 from Expressions 1 to 3.

$$F = P1 \times A1 + P2 \times A2 - P3 \times A3 \quad \text{(Expression 9)}$$

From Expression 8 and Expression 9, as the stroke Xi of the sub valve body 33 increases, the pressure P3 in the back pressure chamber 20 decreases. As a result, the force F applied to the main valve body 5 increases, and the main valve body 5 is pushed up toward the opening direction by the differential pressure. Then, the first oil chamber 21 and the second oil chamber 22 communicate with each other via the oil-chamber communication port 2C, and the communication of the hydraulic oil is enabled. On this occasion, from Expression 9, at such a pressure P3 in the back pressure chamber 20 that F is 0, in other words, in such a state of the opening area H(Xi) of the sub valve body 33 that F is 0, the position of the main valve body 5 is maintained. It should be noted that when the main valve body 5 is pushed up toward the opening direction, the sub fluid chamber 40 extends in proportion to a movement amount of the main valve body 5, and the hydraulic oil corresponding to the volume of the sub fluid chamber 40 is sucked from the back pressure chamber 20 or the discharge port 27S via the sub supply oil path 26. The hydraulic oil filled in the sub fluid chamber 40 functions as lubricant when the main valve body 5 moves, and has such an effect as smoothing the motion of the main valve body 5, and reducing a slide friction and a risk of seizure.

A description will now be given of the flows of the hydraulic oil based on FIG. 1 and FIG. 3, and when the electric motor 31 is driven by the control unit 7 from the state in FIG. 1, the sub valve body 33 moves upward as indicated by an arrow D1 in FIG. 3. As a result, the sub-valve-body communication port 33T is pulled out from the recessed portion 5B (FIG. 1), and the back pressure chamber 20 and the sub-valve-body oil path 33S communicate with each other via the sub-valve-body communication port 33T, and the hydraulic oil is discharged from the back pressure chamber 20 (arrows D2 and D3). The area of the opening of the sub-valve-body communication port 33T increases in accordance with a movement amount of the sub valve body 33, and finally becomes constant (refer to FIG. 5). As a result, the hydraulic oil flows from the first oil chamber 21 (FIG. 1) via the supply oil path 23 into the back pressure chamber 20 (arrow D4). Moreover, as described before, a part of the hydraulic oil in the discharge oil path 27 flows via the sub supply oil path 26 into the sub fluid chamber 40 (arrow D5). Then, a balance of the differential pressure between the backpressure chamber 20 and the first oil chamber 21 changes, and the main valve body 5 moves upward (arrow D6). As a result, the hydraulic oil flows from the first oil chamber 21 into the second oil chamber 22 (arrow D7).

As described before, in this embodiment, when the main valve body 5 is opened, the high pressure of the hydraulic oil in the first oil chamber 21 does not directly act on the sub valve body 33. Thus, the electric motor 31 only needs to generate a driving force for moving the sub valve body 33 including inertia and a friction resistance of the sub valve body 33. Thus, a high electric power for holding the sub valve body 33 against the pressure in the first oil chamber 21 is not required for the electric motor 31. It should be noted that the own weight of the main valve body 5 is considered to be zero in the above description. While the pressure of the hydraulic oil acting on the main valve body 5 is, for example, 650N (66 kg), the own weight of the main valve body is 0.2 kg, and the own weight of the main valve body 5 can thus be considered to be zero. Moreover, when the own weight of the main valve body 5 is higher, the pressure reception areas A1 and A2 increase, and a similar effect as that described above is provided.

<About Valve Closing Operation>

In the valve opening state, when the electric motor 31 is rotated toward the second rotation direction by the control unit 7, and the sub valve body 33 is moved downward, the stroke amount Xi of the sub valve body 33 decreases, and the flow rate Q2 of the hydraulic oil discharged from the back pressure chamber 20 to the discharge oil path 27 decreases. As a result, the pressure P3 in the back pressure chamber 20 increases, and when the relationship of F<0 finally holds true for Expression 9, the main valve body 5 is pressed toward the bottom direction by the differential pressure, and moves toward the closing direction. It should be noted that when the relative position Xi at which the relationship F=0 holds true for Expression 9 is reached, the main valve body 5 stops as in the valve opening operation described before. When the sub valve body 33 is further moved down by the electric motor 31, and reaches the most downward position, the main valve body 5 is pressed against the oil-chamber communication port 2C, and the communication of the hydraulic oil is shut off between the first oil chamber 21 and the second oil chamber 22. It should be noted that when the main valve body 5 is arranged at the main-valve-body sealing position (FIG. 1), the pressure in the back pressure chamber 20 does not directly act on the bottom end surface (sub-valve-body communication port 33T) of the sub valve body 33. As a result, the pushing upward of the sub valve body 33 by the pressure in the back pressure chamber 20 is suppressed. Thus, the sub valve body 33 does not need to be held against the pressure in the back pressure chamber 20 in the valve closed state, and a consumed electric power of the electric motor 31 is thus reduced.

A description will now be given of a case in which the main valve body 5 has a shape satisfying a relationship of AS>AT, which is different from the relationship in this embodiment, for the sake of a description of actions and effects of the flow rate control valve 1 according to this embodiment. When the state in which the main valve body 5 takes the closing action is particularly studied, forces similar to those given by Expression 9 are applied to the main valve body 5. As described before, if the opening area of the oil-chamber communication port 2C opened by the main valve body 5 is wide with respect to the flow rate of the hydraulic oil (large opening, low flow rate), a pressure loss in the oil-chamber communication port 2C is low, and it can be considered that a relationship of P1≈P2 holds true. As a result, Expression 9 can be replaced by Expression 10.

$$F = P1 \times (A1+A2) - P3 \times A3 \quad \text{(Expression 10)}$$

On this occasion, the relationship of AS>AT holds true as described before, and a relationship of A1+A2>A3 thus holds true. Further, a relationship of P1≥P3 hold trues due to the function of the orifice 23S, and F>0 thus holds true for Expression 10. That is, when the relationship of AS>AT holds true, the main valve body 5 remains in the main-valve-body open position, and the main valve body 5 cannot be closed. On the other hand, the relationship of AS≤AT, namely a relationship of A1+A2≤A3 holds true in this embodiment, F<0 holds true, and the force toward the closing direction can be applied to the main valve body 5.

As described before, the position (opening/closing operation) of the main valve body 5 can precisely be controlled through the position control for the sub valve body 33 by the electric motor 31 in this embodiment. Particularly, a variation in the control of the sub valve body 33 (main valve body 5) can be reduced in accordance with a speed reduction ratio of the rotational elevation machine 32 in addition to the precise rotation control provided by the electric motor 31 itself. Moreover, the orifice 23S is arranged in the supply oil path 23. Therefore, the direct application of the high pressure in the first oil chamber 21 to the sub valve body 33 is suppressed. As a result, drive of the sub valve body 33 against the high pressure is not necessary, and the electric motor 31 only needs to generate the driving force for moving the sub valve body 33 relatively to the main valve body 5. Therefore, reductions in electric power consumption, output, and size of the flow rate control valve 1 are realized.

Further, the main valve body 5 has such a shape as satisfying the relationship of AS≤AT. Therefore, when the main valve body 5 moves from the main-valve-body open position to the main-valve-body sealing position, the force acting on the main valve body 5 can be set to a main-valve-body sealing position side by the differential pressure between the first oil chamber 21 and the back pressure chamber 20. Therefore, an energizing member for closing the valve does not necessarily need to be provided, and the main valve body 5 can stably be maintained at the main-valve-body sealing position. As a result, a consumed electric power for resisting against an energizing force of the energizing member can be suppressed in the electric motor 31, and the number of components of the flow rate control valve 1 can simultaneously be reduced.

Moreover, the main valve body 5 includes the first valve-body portion 51 and the second valve-body portion 52 different from each other in the outer diameter, and the relationship of AS<AT can easily be satisfied in this embodiment.

Further, in this embodiment, as the main valve body 5 moves from the main-valve-body sealing position to the main-valve-body open position, a part of the sub fluid chamber 40 is opened so as to be capable of internally receiving the fluid while extending. With this configuration, the smooth movement of the main valve body 5 is realized compared with the case in which the sub fluid chamber 40 is sealed. Moreover, if fluid having lubricity as the hydraulic oil flows into the sub fluid chamber 40, a smoother movement of the main valve body 5 is realized.

Moreover, the flow rate control valve 1 includes the discharge oil path 27 and the sub supply oil path 26 in this embodiment. Therefore, the hydraulic oil flowing from the back pressure chamber 20 or the outside of the casing 2 into the discharge flow path 27 can be used to cause the hydraulic oil to flow into the sub fluid chamber 40.

Moreover, the oil-chamber communication port 2C of the casing 2 has the circular shape as viewed in the axial direction of the center axis CL, and the main-valve-body distal end portion 5A of the main valve body 5 has the conical shape capable of sealing the oil-chamber communication port 2C along the axial direction in this embodiment. Therefore, inflow outflow of the hydraulic oil can stably be blocked over the entirety in the peripheral direction of the main-valve-body distal end portion 5A about the center axis CL by driving the main valve body 5 so that the main-valve-body distal end portion 5A enters into the oil-chamber communication port 2C.

Further, the discharge of the hydraulic oil from the back pressure chamber 20 to the discharge oil path 27 can be blocked by pressing (entering) the bottom end portion of the cylindrical portion 33R of the sub valve body 33 against (into) the recessed portion 5B of the main valve body 5 in this embodiment. Thus, the pressure in the back pressure chamber 20 does not act in the sub valve body 33, and the electric power of the electric motor 31 can be suppressed. Moreover, the sub-valve-body communication port 33T is arranged on the bottom end surface (the end surface crossing the axial direction) of the cylindrical portion 33R of the sub valve body 33, the discharge of the hydraulic oil can thus stably be blocked by the cylindrical portion 33R being pressed against the recessed portion 5B. Further, the bottom end portion of the cylindrical portion 33R has the cylindrical shape (straight pipe shape), and abuts against the conical recessed portion 5B, the seal function is thus maintained over the entirety in the peripheral direction about the center axis CL, and the inflow/outflow of the hydraulic oil can be prevented. As a result, the discharge of the hydraulic oil can stably be blocked. Moreover, the sub-valve-body communication port 33T is opened on the cylindrical portion 33R of the sub valve body 33, and the pressure in the back pressure chamber 20 is thus less likely applied to the sub-valve-body communication port 33T. Particularly, the bottom end surface of the cylindrical portion 33R of the sub valve body 33 is arranged in the bottom portion of the cylindrical space 5S of the main valve body 5, and the pressure in the back pressure chamber 20 is less likely applied to the bottom end surface of the cylindrical portion 33R of the sub valve body 33. Therefore, consumption of a high electric power for maintaining the position of the sub valve body 33 in the valve closed state is suppressed.

A description has been given of the flow rate control valve 1 (electrically-driven flow rate control valve) according to the embodiment of the present invention. It should be noted that the present invention is not limited to the embodiment. As electrically-driven flow rate control valves according to the present invention, the following modified embodiments are conceivable.

Figure 6:
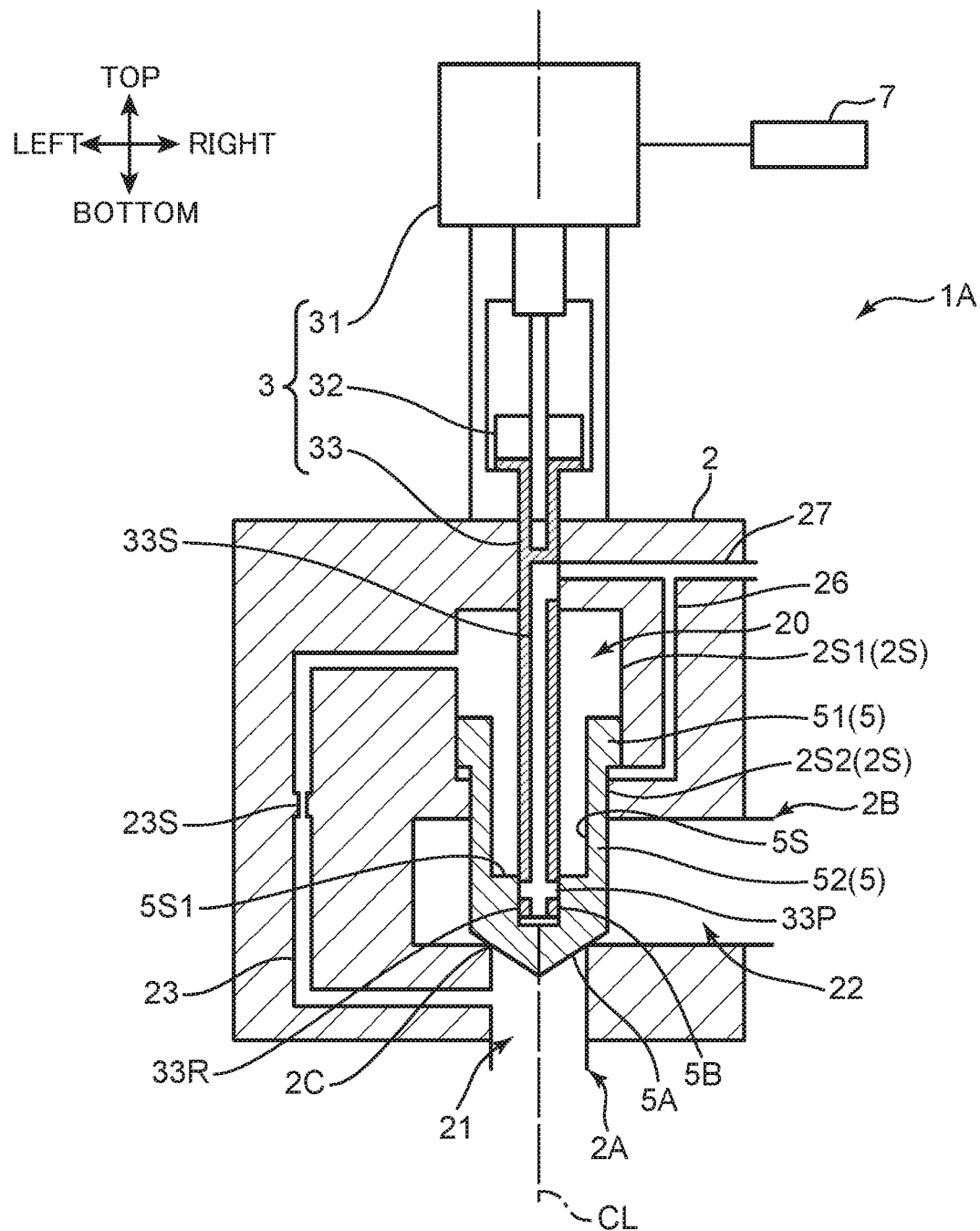
FIG. 6 is a cross sectional view of an electrically-driven flow rate control valve according to a first modified embodiment of the present invention.
Figure 7:
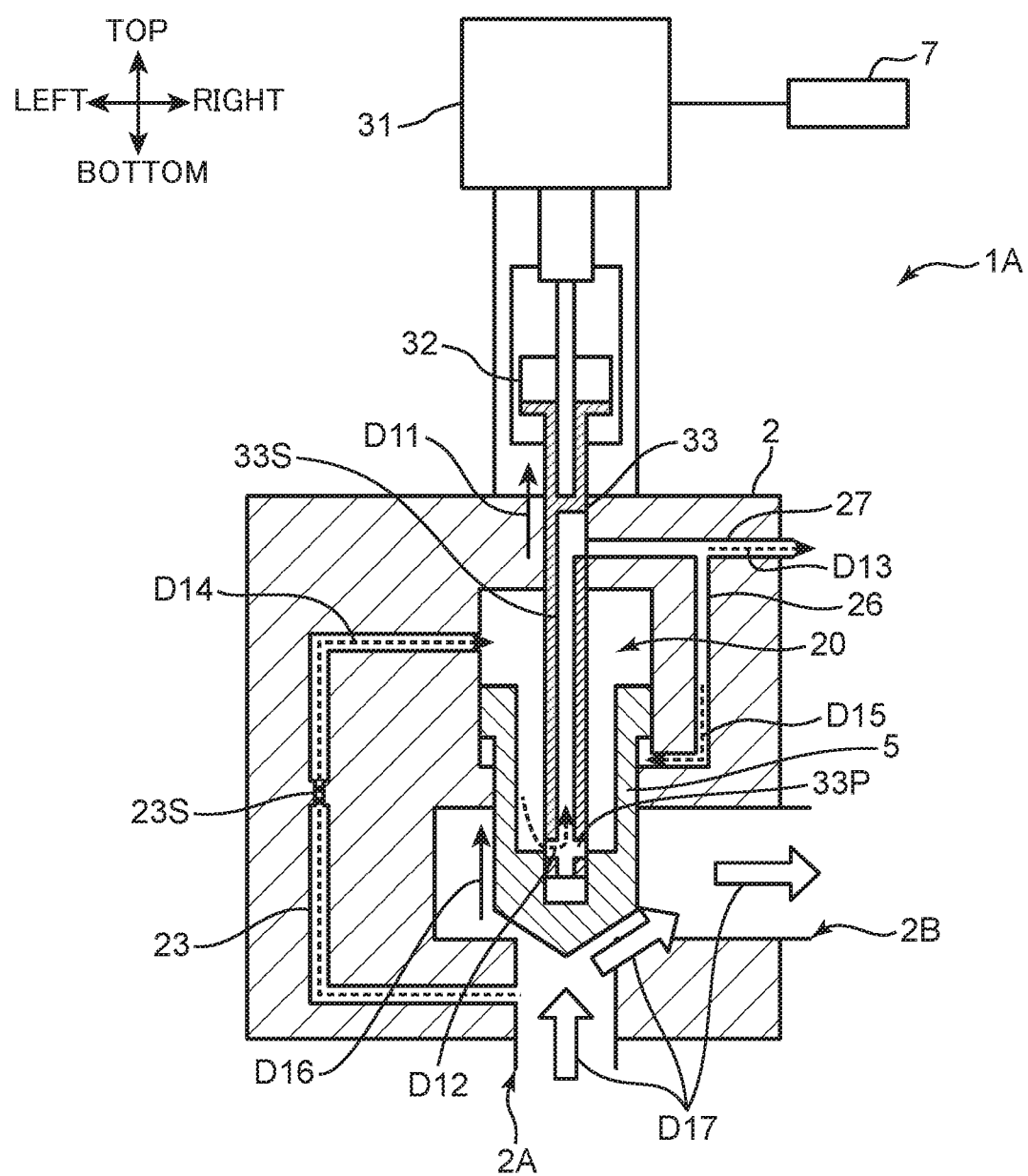
FIG. 7 is a cross sectional view of the state of the opening of the main valve body of the electrically-driven flow rate control valve in FIG. 6.

(1) Although a description has been given of the form in which the sub-valve-body communication port 33T is opened on the bottom end surface of the cylindrical portion 33R of the sub valve body 33, and the conical recessed portion 5B is simultaneously provided in the distal-end inner wall portion 5S1 of the main valve body 5 in the embodiment, the present invention is not limited to this form. The recessed portion 5B in FIG. 1 may be formed into a cylindrical shape as the bottom end portion of the cylindrical portion 33R. The sub-valve-body communication port 33T can be sealed by the bottom end portion of the cylindrical portion 33R entering into the cylindrical recessed portion 5B also in this case. Moreover, the sub-valve-body communication port 33T is not limited to such a form as being opened on the bottom end surface of the cylindrical portion 33R. FIG. 6 is a cross sectional view of an electrically-driven flow rate control valve 1A according to a first modified embodiment of the present invention. FIG. 7 is a cross sectional view of the state of the opening of the main valve body 5 of the electrically-driven flow rate control valve 1A in FIG. 6 opens.

This modified embodiment is different from the embodiment in the arrangement of sub-valve-body communication ports 33P and the shape of the recessed portion 5B of the main valve body 5, and a description will thus mainly be given of these different points. The distal-end inner wall portion 5S1 of the main valve body 5 has the recessed portion 5B permitting the cylindrical portion 33R of the sub valve body 33 to enter and to simultaneously come in close contact with an entirety in the peripheral direction. The recessed portion 5B has a cylindrical shape, and an inner diameter of the recessed portion 5B is set to be slightly larger than an outer diameter of the cylindrical portion 33R. On the other hand, a pair of left and right sub-valve-body communication ports 33P are opened each in a circular shape on a side surface (peripheral surface) extending along the axial direction of the cylindrical portion 33R. The pair of sub-valve-body communication ports 33P communicate with the sub-valve-body oil path 33S. It should be noted that the shape of the openings of the sub-valve-body communication ports 33P may be another shape.

When the cylindrical portion 33R enters into the recessed portion 5B as the sub valve body 33 moves toward the bottom direction, the pair of the sub-valve-body communication ports 33P are sealed by an inner peripheral surface of the recessed portion 5B. On the other hand, when the cylindrical portion 33R separates from the recessed portion 5B as the sub valve body 33 moves toward the top direction, the pair of the sub-valve-body communication ports 33P communicate with the back pressure chamber 20. The sub-valve-body communication ports 33P are arranged at such positions that this function is provided.

Specifically, when the electric motor 31 is driven by the control unit 7 from the state in FIG. 6, the sub valve body 33 moves upward as indicated by an arrow D11 in FIG. 7. As a result, the sub-valve-body communication ports 33P are pulled out from the recessed portion 5B (FIG. 6), and the back pressure chamber 20 and the sub-valve-body oil path 33S communicate with each other via the sub-valve-body communication ports 33P, and the hydraulic oil is discharged from the back pressure chamber 20 (arrows D12 and D13). An area of the openings of the sub-valve-body communication ports 33P increases in accordance with the movement amount of the sub valve body 33, and finally becomes constant (refer to FIG. 5). As a result, the hydraulic oil flows from the first oil chamber 21 (FIG. 6) via the supply oil path 23 into the back pressure chamber 20 (arrow D14). On this occasion, a part of the hydraulic oil can flow into the sub fluid chamber 40 from the discharge oil path 27 via the sub supply oil path 26 (arrow D15) also in this modified embodiment. Then, the balance of the differential pressure between the back pressure chamber 20 and the first oil chamber 21 changes, and the main valve body 5 moves upward (arrow D16) as in the embodiment. As a result, the hydraulic oil flows from the first oil chamber 21 into the second oil chamber 22 (arrow D17).

The discharge of the hydraulic oil from the back pressure chamber 20 into the sub-valve-body flow path 33S can be blocked by the cylindrical portion 33R of the sub valve body 33 entering into the recessed portion 5B of the main valve body 5 as described before also in this modified embodiment. Moreover, the area of the openings of the sub-valve-body communication ports 33P is adjusted in accordance with a relative movement of the sub valve body 33 with respect to the main valve body 5, and the opening/closing operation of the main valve body 5 can thus precisely be controlled. Moreover, the sub-valve-body communication ports 33P are provided on the side surface of the cylindrical portion 33R in this modified embodiment. Therefore, the degrees of freedom of the sub-valve-body communication ports 33P can be increased in an opening gain (an amount of the change in H(Xi) with respect to Xi). For example, the movement amount of the main valve body 5 to the movement amount of the sub valve body 33 can be reduced by reducing the opening gain of the sub-valve-body communication ports 33P, and precision and stability of the valve opening operation can thus be increased.

Figure 8:
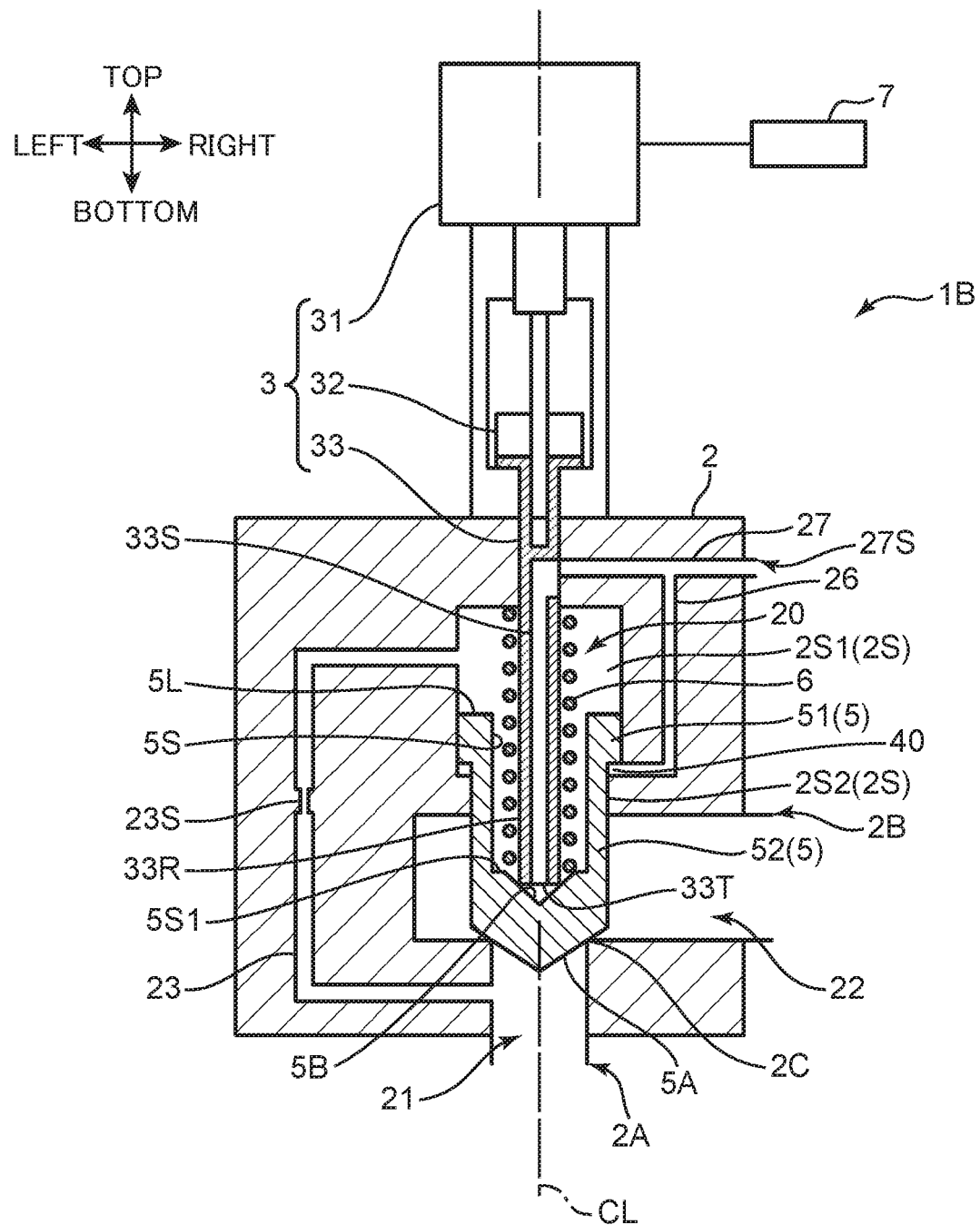
FIG. 8 is a cross sectional view of an electrically-driven flow rate control valve according to a second modified embodiment of the present invention.

Further, FIG. 8 is a cross sectional view of a flow rate control valve 1B (electrically-driven flow rate control valve) according to a second modified embodiment of the present invention. The flow rate control valve 1B further includes a closing spring 6 in this modified embodiment compared with the flow rate control valve 1 (FIG. 1) according to the first modified embodiment.

The closing spring 6 energizes the main valve body 5 along the center axis CL toward the main-valve-body sealing position. The closing spring 6 is arranged so as to externally fit to the sub valve body 33 in the back pressure chamber 20 and the cylindrical space 5S of the main valve body 5 in this modified embodiment as shown in FIG. 8. A top end portion of the closing spring 6 is fixed to an inner wall portion (top surface portion of the back pressure chamber 20) of the casing 2, and a bottom end portion of the closing spring 6 is fixed to the distal-end inner wall portion 5S1 of the main valve body 5. The spring modulus of the closing spring 6 is defined as ks, and a spring setting force (a force of energizing the main valve body 5 in an initial state) of the closing spring 6 is defined as Fs0. In this case, a spring force Fs applied to the main valve body 5 by the closing spring 6 can be given by Expression 11. The spring force Fs changes in accordance with the movement amount of the main valve body 5.

$$Fs = Fs0 + ks \times X \quad \text{(Expression 11)}$$

As a result, the farce applied to the main valve body 5 can be given by Expression 12 in place of Expression 9.

$$F = P1 \times A1 + P2 \times A2 - (P3 \times A3 + (Fs0 + ks \times X)) \quad \text{(Expression 12)}$$

Figure 9:
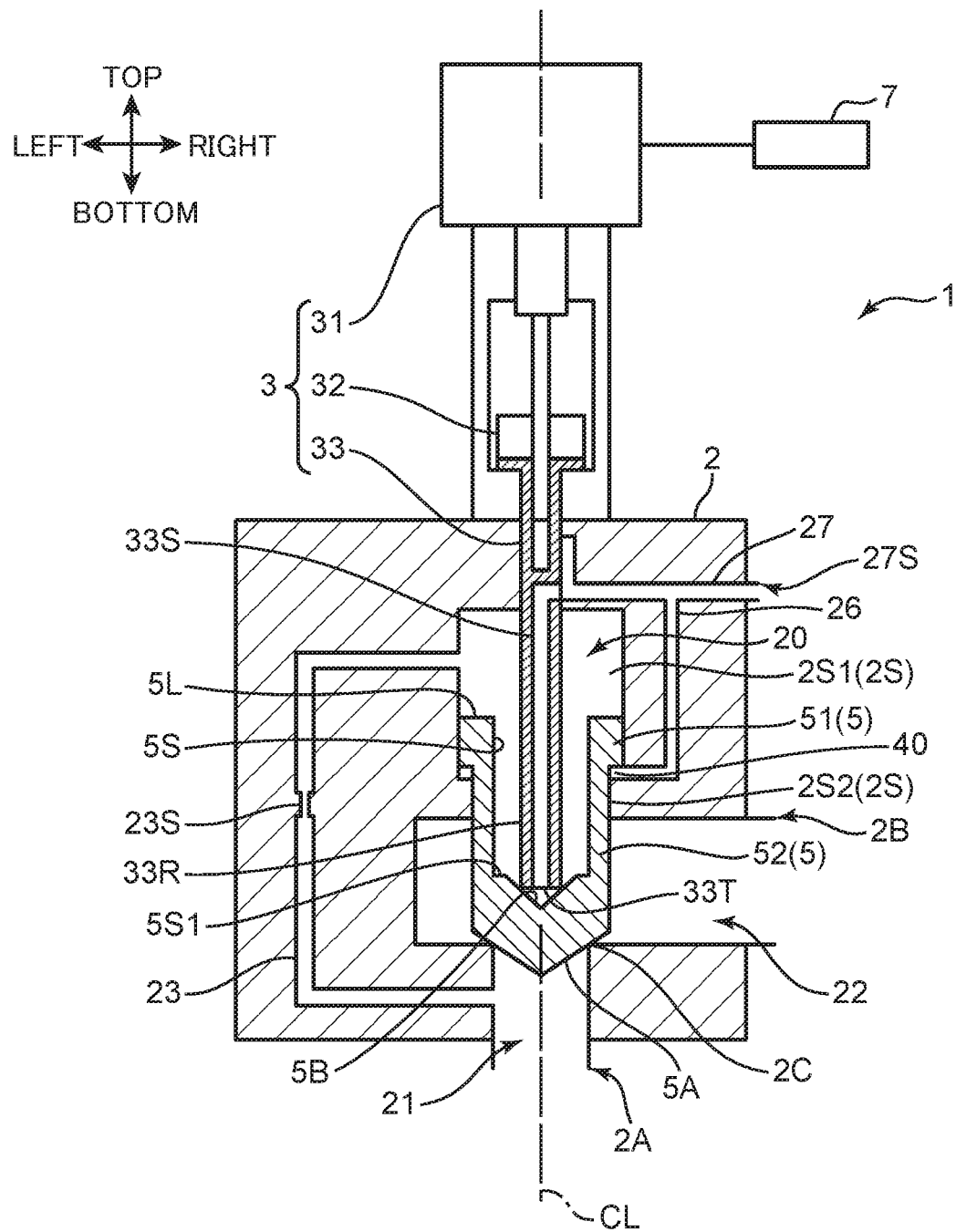
FIG. 9 is a cross sectional view of the electrically-driven flow rate control valve according to another modified embodiment of the present invention.
Figure 10:
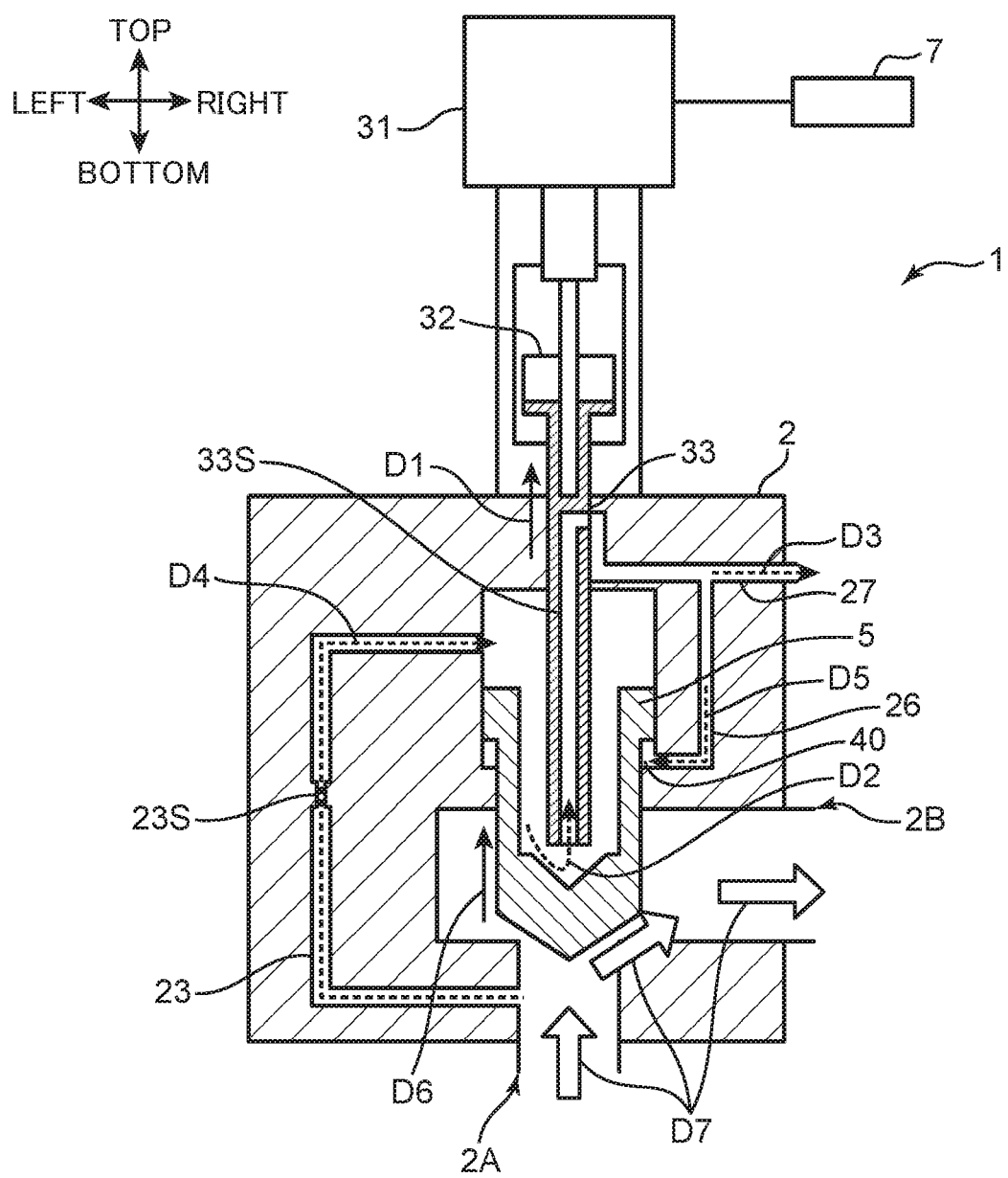
FIG. 10 is a cross sectional view of the electrically-driven flow rate control valve according to another modified embodiment of the present invention.

With this configuration, even in a state in which the flow rate control valve 1 is vertically inverted (the electric motor 31 in FIG. 1 is on the bottom side), and the pressurized oil is not supplied to the flow rate control valve 1, the state in which the main valve body 5 is pressed against the oil-chamber communication port 2C can be maintained. Therefore, the closing spring 6 only needs to have the spring force Fs (spring modulus ks) as strong as supporting the own weight of the main valve body 5. The main valve body 5 can be pressed against the oil-chamber communication port 2C by the spring force Fs of the closing spring 6 in this way in this modified embodiment. Therefore, a movement of the main valve body 5 against an intention of a worker is suppressed during transfer, transport, and the like of the flow rate control valve 1, and sliding parts of the main valve body 5 and the cylinder portion 2S and the sub valve body 33 are prevented from being damaged. Further, the pressure in the back pressure chamber 20 is less likely applied to the bottom end surface of the sub valve body 33 also in the respective modified embodiments, and the consumed electric power of the electric motor 31 is thus reduced. The present invention is not limited to the embodiments described above. For example, in the embodiments shown in FIGS. 9 and 10, the inlet port of the discharge oil path 27 is formed in a shape extending upward so as to maintain the communication between the sub-valve-body oil path 33S and the discharge oil path 27, regardless of the upward or downward movement of the sub valve body 33.

What is claimed is:

1. An electrically-driven flow rate control valve comprising:
    a casing including a first fluid chamber, a second fluid chamber, a fluid-chamber communication port for causing the first fluid chamber and the second fluid chamber to communicate with each other, and a cylinder portion, wherein a reception port capable of receiving a fluid from an outside of the casing into the first fluid chamber and a discharge port capable of discharging the fluid from the second fluid chamber to the outside of the casing are formed on the casing;
    an electric motor;
    a main valve body which is stored in the cylinder portion so as to be movable between a main-valve-body open position and a main-valve-body sealing position along a predetermined axial direction, forms a back pressure chamber which the fluid can enter into/exit from between the main valve body and the cylinder portion, and includes a main-valve-body distal end portion capable of sealing the fluid-chamber communication port and a main-valve-body base end portion facing the back pressure chamber on an opposite side of the main-valve-body distal end portion in the axial direction, wherein the main-valve-body distal end portion opens the fluid-chamber communication port, thereby permitting communication of the fluid between the first fluid chamber and the second fluid chamber when the main valve body is arranged at the main-valve-body open position, and the main-valve-body distal end portion seals the fluid-chamber communication port, thereby shutting off the communication of the fluid between the first fluid chamber and the second fluid chamber when the main valve body is arranged at the main-valve-body sealing position;
    a communication path capable of causing the first fluid chamber the back pressure chamber to communicate with each other;
    a flow-rate regulating mechanism, which is arranged in the communication path, and regulates a flow rate of the fluid so as to reduce the flow rate of the fluid flowing from the first fluid chamber toward the back pressure chamber; and
    a sub valve body, which is stored in the back pressure chamber, includes a sub-valve-body flow path communicating with the outside of the casing and a sub-valve-body communication port causing the back pressure chamber and the sub-valve-body flow path to communicate with each other, receives a driving force generated by the electric motor, thereby being capable of relatively moving along the axial direction with respect to the main valve body between a sub-valve-body open position and a sub-valve-body sealing position, opens the sub-valve-body communication port, thereby permitting the fluid in the back pressure chamber to be discharged via the sub-valve-body flow path to the outside of the casing when the sub valve body is arranged at the sub-valve-body open position, and seals the sub-valve-body communication port, thereby shutting off the communication of the fluid between the back pressure chamber and the sub-valve-body flow path when the sub valve body is arranged at the sub-valve-body sealing position,
    wherein the main valve body has such a shape as satisfying a relationship of AS<AT where AS is an area of the main-valve-body distal end portion projected in the axial direction, and AT is an area of the main-valve-body base end portion projected in the axial direction.

2. The electrically-driven flow rate control valve according to claim 1,
    wherein the main valve body includes:
        a first valve-body portion including the main-valve-body base end portion; and
        a second valve-body portion including the main-valve-body distal end portion,
    wherein the maximum dimension of the first valve-body portion in a cross section orthogonal to the axial direction is set to be larger than the maximum dimension of the second valve-body portion in the cross section so as to satisfy the relationship of AS<AT.

3. The electrically-driven flow rate control valve according to claim 2, further comprising a sub fluid chamber defined by at least a step portion between the first valve-body portion and the second valve-body portion and the cylinder portion, wherein a part of the sub fluid chamber is opened so as to be capable of internally receiving the fluid while extending as the main valve body moves from the main-valve-body sealing position to the main-valve-body open position.

4. The electrically-driven flow rate control valve, according to claim 3, further comprising:
 a discharge flow path, which communicates with the sub-valve-body flow path, and leads the fluid having flown from the back pressure chamber into the sub-valve-body flow path to the outside of the casing; and
 a sub communication path causing the discharge flow path and the sub fluid chamber to communicate with each other.

5. The electrically-driven flow rate control valve, according to claim 1,
 wherein the fluid-chamber communication port has a circular shape as viewed along the axial direction, and
 wherein the main-valve-body distal end portion has a conical shape capable of sealing the fluid-chamber communication port along the axial direction.

6. The electrically-driven flow rate control valve, according to claim 1,
 wherein the main valve body includes an inner space, which communicates with the back pressure chamber on an opposite side of the main-valve-body distal end portion, and is formed into a tubular shape along the axial direction, and into which the sub valve body can enter, and a distal-end inner wall portion defining a side of the main-valve-body distal end portion of the inner space,
 wherein the sub valve body includes a cylindrical portion arranged at least in an end portion on a side of the distal-end inner wall portion, and the sub-valve-body communication port is opened in the cylindrical portion, and
 wherein the distal-end inner wall portion includes a recessed portion, which permits the cylindrical portion of the sub valve body to enter, and is brought into close contact with an entirety in a peripheral direction of the cylindrical portion.

7. The electrically-driven flow rate control valve, according to claim 6, wherein the sub-valve-body communication port is opened on an end surface crossing the axial direction of the cylindrical portion of the sub valve body.

8. The electrically-driven flow rate control valve, according to claim 7, wherein the recessed portion of the distal-end inner wall portion is formed into a conical shape, and an inclined surface of the recessed portion is in close contact with an entirety in the peripheral direction of a peripheral edge of the end surface of the cylindrical portion when the sub valve body is arranged at the sub-valve-body sealing position.

9. The electrically-driven flow rate control valve, according to claim 6,
 wherein the sub-valve-body communication port is opened on a side surface extending along the axial direction of the cylindrical portion of the sub valve body,
 wherein the recessed portion is formed into a cylindrical shape so that the cylindrical portion can enter, and
 wherein the sub-valve-body communication port is arranged at such a position of the cylindrical portion that the sub-valve-body communication port is sealed when the cylindrical portion enters into the recessed portion as the sub valve body moves, and the sub-valve-body communication port communicates with the back pressure chamber when the cylindrical portion separates from the recessed portion as the sub valve body moves.

* * * * *